(12) United States Patent
Bert et al.

(10) Patent No.: US 6,171,627 B1
(45) Date of Patent: Jan. 9, 2001

(54) METHOD FOR PACKAGED BONE-IN CUTS OF MEAT

(75) Inventors: Roger Douglas Bert, Beaver Lake, NE (US); John Stephen Siwinski, Oak Forest, IL (US)

(73) Assignee: Curwood, Inc., Oshkosh, WI (US)

( * ) Notice: Under 35 U.S.C. 154(b), the term of this patent shall be extended for 0 days.

(21) Appl. No.: 09/414,443

(22) Filed: Oct. 7, 1999

Related U.S. Application Data

(62) Division of application No. 09/131,836, filed on Aug. 10, 1998, now Pat. No. 6,004,599.

(51) Int. Cl.[7] ................................................. A23B 7/144
(52) U.S. Cl. .......................... 426/415; 426/412; 426/413; 53/427; 53/432; 53/477; 53/510
(58) Field of Search ..................................... 426/129, 124, 426/410, 412, 413, 415; 53/343, 373.7, 432, 449, 375.9, 427, 477, 510; 383/109; 206/524.8

(56) References Cited

U.S. PATENT DOCUMENTS

| | | |
|---|---|---|
| 2,314,300 | 3/1943 | Williams et al. . |
| 2,891,870 | 6/1959 | Selby et al. . |
| 3,983,258 | 9/1976 | Weaver . |
| 4,136,205 | 1/1979 | Quattlebaum . |
| 4,481,669 | 11/1984 | Pezzana . |
| 4,704,101 | 11/1987 | Schirmer . |
| 4,755,403 | 7/1988 | Ferguson . |
| 5,020,922 | 6/1991 | Schirmer . |

*Primary Examiner*—Gabrielle Brouillette
*Assistant Examiner*—Hao Mai
(74) *Attorney, Agent, or Firm*—Lee, Mann, Smith, McWilliams, Sweeney & Ohlson

(57) ABSTRACT

Disclosed is a bag arrangement and packaging method for packaging bone-in cuts of meat using two bags to provide a double wall of film surrounding the cut of meat for bone puncture resistance. Both bags are bottom sealed bags formed of a heat shrink film, the inner bag has an interrupted bottom seal to provide an opening for venting air between the bags and the outer bag has a continuous bottom seal. The outer bag is longer than the inner bag so the outer bag can be closed without involving any portion of the inner bag in the closure. The bone-in cut of meat is inserted first into the first bag and then the first bag and its contents are inserted into the second bag, the bags are evacuated and then the outer bag is closed.

5 Claims, 1 Drawing Sheet

METHOD FOR PACKAGED BONE-IN CUTS OF MEAT

This is division of U.S. patent application Ser. No. 09/131,836 filed Aug. 10, 1998, now U.S. Pat. No. 6,004,599.

TECHNICAL FIELD

The present invention relates to the packaging of bone-in cuts of meat and more particularly to a method and means for packaging such meat cuts in a heat shrink bag arrangement which decreases the likelihood of a bone puncturing through the bag.

BACKGROUND OF THE INVENTION

The use of bags formed of a heat-shrinkable thermoplastic film for packaging primal and sub-primal cuts of meat is well known in the art. In use, to the cut of meat is loaded into the bag. The bag is evacuated to remove air so the bag collapses against the cut of meat and then it is heat sealed to maintain the evacuation. Next the bag is exposed to warm water at about 90° C. or other heating means causing the bag to shrink and form fit the cut of meat. Packaging in this fashion excludes air from the package to prolong shelf life and reduces weight loss due to drying of the meat.

The bag film is relatively thin and usually not more than about 3 to 4 mils (0.076 to 0.10 mm) thick. Accordingly, these bags generally are not suitable for packaging cuts of meat which contain bones. For example, the ribs or other sharp bone protrusions as contained by rib beef cuts or pork loins and other meat cuts may puncture the bag during the evacuation of air or during heat shrinking as the bag draws tightly about the bone-in meat cut. Any puncture in the bag is undesirable as it allows the meat cut in the bag and especially in the area of the puncture to be exposed to the air. The puncture also is a possible source of contamination. The problem of bone punctures is compounded by abrasion during movement of the package along a conveyer and as it is loaded into corrugated boxes and by abrasion between adjacent packages caused by vibration and movement of the meat packages one against another during transport and handling.

One technique for preventing bone puncture is to overlay the protruding bones of the cut of meat with paper, cloth or a wax impregnated cloth prior to insertion into the bag. This is shown for example in U.S. Pat. Nos. 2,891,870 and 4,136,205. Another common solution is to improve the puncture and abrasion resistance of the bag film by adhering a patch to the outer surface of the heat-shrinkable bag. U.S. Pat. No. 4,755,403 discloses use of an oriented heat-shrinkable patch affixed by an adhesive to the surface of a heat-shrinkable bag and U.S. Pat. No. 5,302,402 discloses a non oriented patch adhered to the bag surface by corona treatment. In order to provide the bag with greater protection, U.S. Pat. No. 5,545,419 discloses adhering two heat shrinkable patches to the bag, one to each outer surface of the flattened bag. The patches even may extend over the side edges to insure that coverage extends the full width of the bag.

Neither the cloth nor paper overlay nor a patch adhered to the outer surface of the bag are entirely acceptable solutions to the problem of preventing bone punctures and providing abrasion resistance. One reason for this is that the overlay may be dislocated from its laid-on position as the bone-in cut of meat is inserted into a bag. Patch-bags with one patch require some manipulation of the heavy cut of meat to insure that the patch is properly oriented over the protruding bones. Another drawback of patch bags is the cost of manufacturing the patch material and the added cost of having to laminate one or more patches to the bag. Also, the patch material generally is thicker than the bag. As a result the patch bag tends to be relatively stiff due to its thickness and this stiffness further adds to the difficulty of handling the bag during a packaging operation.

Attempts to avoid applying a patch to the bag have included manufacturing the bag with multiple plies along one side to provide bone puncture resistance. For example U.S. Pat. Nos. 4,704,101 and 5,020,922 disclose heat sealing a wide area of a laid flat tubing to itself to form a double thickness, corona treating one flattened side and then folding the tubing so that the double thickness overlays one of the flatted sides. This forms a triple ply along one side of the bag and a single ply along an opposite side wherein all the adjacent surfaces of the three ply side are interfacially bonded. U.S. Pat. No. 4,481,669 discloses inserting a narrow longitudinally folded web into a wider longitudinally folded web and then heat sealing across the webs to form side sealed bags which have a single thickness adjacent the bag mouth while the rest of the bag has a double thickness. Further, the webs are corona treated so that the plies of the bag adhere one to the other. It is believed that due to the complex nature of the manufacturing process, neither of these bags has a commercial embodiment.

Accordingly, it is an object of the present invention to provide an improved heat shrinkable bag structure and method for packaging bone-in cuts of meat.

Another object of the present invention is to provide a bag for packaging bone-in cuts of meat that has a wall structure which is two plies thick for bone puncture resistance A further object is to provide a bag structure for packaging bone-in cuts of meat which locates a double thickness of bag film around the entire cut of meat for puncture resistance and yet has only a single thickness in the region of the bag closure.

Still further object is to provide a bag-in-a-bag structure for packaging bone-in meat cuts wherein the inner bag includes at least one opening remote from the bag mouth to facilitate evacuation of air from between the bags.

Yet another object of the present invention is to provide an improved method for packaging bone-in cuts of meat wherein double-bagging is used to provide bone puncture resistance.

SUMMARY OF THE INVENTION

The present invention involves the use of two individual bottom sealed bags to package a bone-in cut of meat. Bottom sealed bags are made by laying a tubular film flat and then making transverse heat seals across the bag width at spaced intervals to weld the flattened sides of the tube together. The tube is severed at the same time it is heat sealed. This forms a so called "bottom sealed" bag which, when it is laid flat, has a bottom edge formed by the heat seal, an open mouth formed by the severed edge and two seamless side edges formed by the fold produced when the tube is laid flat.

The two bottom sealed bags according to the present invention are to be disposed one within the other. These two bags are slightly different in construction. A first bag, to be used as the inner bag, is shorter than the other. The open end of the inner bag should be more blunt as compared to the open end of the other bag for reasons set out hereinbelow. Also, its bottom seal is interrupted or not complete all the way across the bag width to provide a passage for venting air from one bag to the other. A second bag, to be used as the outer bag, is longer than the first bag and its bottom seal is continuous across the bag width. Other differences are further set out hereinbelow.

The bags can be made of different films to provide different properties. For example, the outer bag can be a film structure having oxygen and moisture barrier layers while the inner bag is a non barrier film. At least the outer bag and preferably both bags are formed of a heat shrinkable film. For purposes of the present invention, the term "heat shrinkable" means that the film used in making the bags is biaxially oriented such that it has an unrestrained shrink of at least 10% and preferably at least 30 to 40% shrink or more in each of the transverse and machine directions measured at 90° C. Free shrink is measured by cutting a square piece of film measuring 10 cm in each of the machine and transverse directions. The film is immersed in water at 90° C. for five seconds. After removal from the water the piece is measured and the difference from the original dimension is multiplied by ten to obtain the percentage of shrink. It also is preferred that both bags be made from the same film to avoid the need for different film extrusion lines.

A suitable film is a multilayer film having a barrier layer disposed between a heat sealing layer and an abuse layer. The inner or heat seal layer is a blend of four polymers including:

a) a first polymer, and specifically Mitsui Petrochemical Industries TAFMER® A0585x which is a $C_2$–$C_4$ copolymer having a density of 0.885 g/cm$^3$ melt index (MI) of 0.5 dg/mm, a melting point (MP) of 68° C., which is referred to herein as "Plastomer";

b) a second polymer such as a Dow Chemical Company AFFINITY® PL1880 which is an ethylene-octene copolymer having a density of about 0.902 g/cm$^3$, a MI of about 1.0 dg/min. and an MP of about 100° C. Dow's AFFINITY resins are made using constrained geometry catalysts which, are referred to herein as metallocene very low density polyethylene (mVLDPE);

c) a third polymer such as Dow's ATTANE® XU 61509.32 which is an ethylene-octene copolymer having a density of about 0.912 g/cm$^3$, a MI of about 0.5 dg/min., an MP of about 122° C. and a Vicat Softening Point of 95° C., which is referred to herein as VLDPE.

d) a fourth polymer and such as an Exxon Chemical Company LD 701.06 EVA having a vinyl acetate content of 10.5%, a density of 0.93 g/cm, a MI of 0.19 dg/min. and an MP of about 97° C.

The film core or barrier layer is any suitable barrier material such as vinylidene chloride-methacrylate (VDC-MA) copolymer or a vinylidene chlorid-evinyl chloride (VDC-VC) copolymer or a blend of barrier materials.

The outer abuse layer of the film was formulated of a blend of:

a) the first polymer (Plastomer) such as a Mitsui Tafmer A 0585X;

b) the second polymer (mVLDPE) such as a Dow AFFINITY PL1880; and c) the fourth polymer (EVA) such as an Exxon LD 701.06.

A suitable blend for the heat seal layer is about 24 wt. % of the Plastomer, about 29 wt. % of the mVLDPE, about 19 wt. % of the VLDPE and about 19 wt. % of the EVA with the balance being slip aids and stabilizers.

A suitable blend for the abuse layer is about 24 wt.% of the Plastomer, 47 wt. % of the mVLDPE and about 24 wt. % of the EVA with the balance being processing aids.

The inner and outer bags can be made with the same bag making equipment merely by changing the heat sealing assembly. One assembly would have a shape to form the continuous heat seal bottom edge of the outer bag. The second assembly would have a shape to form the interrupted heat seal of the inner bag. In fact, if desired, the same heat sealer could be used to make both bags. The only change needed in this case is to mask off a short section of the heat sealer to make the interrupted seal of the inner bag. If desired, the inner bag can be slightly narrower than the outer bag to facilitate the insertion of the inner bag into the outer. However having different width bags is not essential. It is preferred, however, that the inner bag be shorter than the outer. This allows closing the bag by heat sealing through only the film thickness of one bag as is conventional, rather than through the double thickness of two bags.

In the method of the present invention, the bone-in cut of meat is double bagged. The operator first puts the bone-in cut of meat into the inner bag. The inner bag then is put into the outer bag. The bags are evacuated in a conventional manner which draws air from the inner and outer bags. The interrupted seal of the inner bag allows communication of the air spaces between the bags to insure that air is evacuated from both bags and from between the bags. Next the outer bag is closed in a conventional manner to maintain evacuated conditions. Since the inner bag is shorter than the outer bag, closing the outer bag involves only the single film thickness of the outer bag. This is particularly important when using a heat sealer to close the bag as it is easier to heat seal through two film plies than through four.

Accordingly, the present invention may be characterized in one aspect thereof by a double wall bag comprising a pair of heat shrinkable bottom sealed bags placed one within the other. The outer bag is has a continuous heat seal extending across the bag width which forms the closed bottom of the outer bag. The inner bag is shorter in length than the outer bag and has an interrupted heat seal extending across the bag flat width forming the bottom of the inner bag. The interrupted seal defines an opening that permits the passage of air between the two bags.

In another aspect, the present invention may be characterized by a method for packaging bone-in cuts of meat comprising:

a) inserting a bone-in cut of meat into the open end of a first bottom sealed bag formed of a heat shrinkable film, the heat seal forming the bottom of the bag having at least one opening which provides access to the interior of the bag;

b) inserting the first bag and the bone-in meat cut it contains into a second bottom sealed bag formed of a heat shrinkable film, the second bag having a length greater than the first bag;

c) evacuating air from the first and second bags by communicating the second bag to a source of vacuum wherein the opening in the bottom seal of the first bag allows the passage of air from one bag to the other;

d) closing the second bag by forming an air tight closure from the extra length of bag film without involving any portion of the first bag in said closure; and e) exposing the evacuated package to heat shrinking temperatures to heat shrink at least the second bag thereby forming an article comprising a bone-in cut of meat in an evacuated double walled heat shrunk film package.

DETAILED DESCRIPTION OF THE INVENTION

Figure 1:
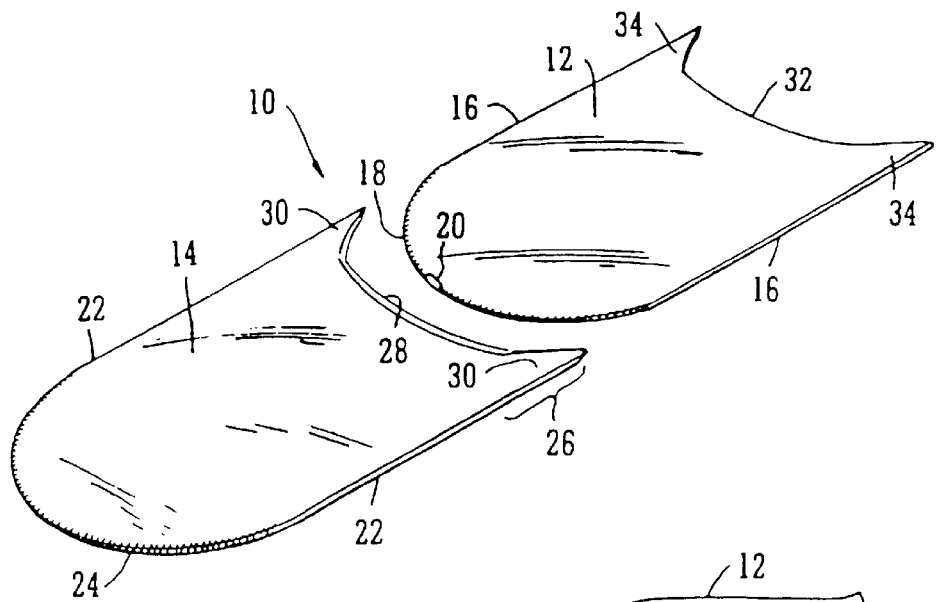
FIG. 1 is a perspective view showing the double bag structure of the present invention.

Referring to the drawings, FIG. 1 shows the double bag structure of the present invention generally indicated at 10. The double bag structure includes a first bag 12 which is the inner bag, and a second bag 14 which is the outer bag. At least the outer bag 14 is made of a heat shrinkable film and preferably, both bags are heat shrinkable.

While both bags may be made of the same film, it is preferred that at least the outer bag 14 comprises a barrier film. A "barrier" or "barrier layer" means a layer of a multilayer film which acts as a physical barrier to oxygen and moisture. The barrier layer will reduce the oxygen permeability of the film used to make the bags to less than 70 cc per square meter in 24 hours at one atmosphere at 23° C. and 0% relative humidity. These values should be measured in accordance with ASTM standard D-1434.

The inner bag 12 may be a side sealed bag and the outer bag 14 a bottom sealed bag. However, it is preferred that both bags are bottom sealed bags. As noted above, a bottom sealed bag is formed from tube stock. The tube is collapsed so it lays flat and a heat seal is made across the tube to form the closed bottom edge of the bag. The side edges of a bottom sealed bag are seamless in that the side edges of the bag are merely folds in the laid flat tubing. Bottom sealed bags are distinguished from side sealed bags. The latter are formed by folding a web and applying two spaced heat seals across the folded web such that the fold forms the bottom of the bag and the two spaced heat seals form the side edges of the bag.

Accordingly, first bag 12 has seamless side edges 16 and a bottom edge 18. defined by a heat seal formed by heat sealing the flattened sides of tubular film together. As shown in FIG. 1, the first bag has a vent opening 20 which is spaced from the open end 32 of the bag. Preferably the vent opening is provided in the heat seal that defines the bottom edge 18 of the bag. In this respect, the heat seal is not continuous. Instead, the seal is interrupted to provide the vent opening 20. While one opening is shown, several openings may be provided along the length of the seal. If the inner bag is a side sealed bag, then the opening 20 is provided either in one or both side seals or is cut in the folded bottom of the bag. In any event it is preferred that the vent opening be spaced from the open end of the bag as shown so that the opening is located adjacent the bottom of the bag.

The second bag 14 is conventional in that it has seamless side edges 22 and a bottom edge 24 formed by a continuous heat seal. Also, for purposes of the present invention, it is important that the second bag be longer than the first bag, the extra length being indicated at 26.

The heat seal forming the bottom edge of each bag may extend straight across the bag. It is preferred, however, that the heat seal be arcuate such that the bottoms of both bags are convex. This convex shape provides a better fit with the cut of meat inserted into the bag and a better appearing package after heat shrinking. In making bottom sealed bags, the same arc shape for the heat seal is followed to cut off the bag so that the open end of the bag is concave.

Referring to the shape of the second bag 14, FIG. 1 shows that the concave shape at the bag open end 28 produces "ears" 30 which bracket the open end. Similar ears are not desired at the open 32 of the first bag for reasons set out hereinbelow. Accordingly, it is preferred that the arc shape forming the bottom edge 18 of the first bag be shallower than that of the second bag. This produces a less concave shape for the open end 32 of the first bag and reduces the prominence of the resulting ears 34.

Figure 2:
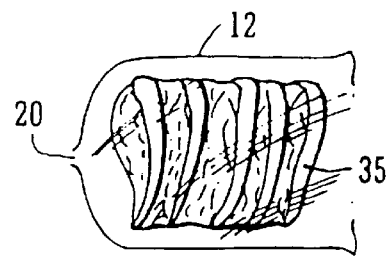
FIGS. 2–5 illustrate steps in a packaging method using the bag of the present invention.
Figure 3:
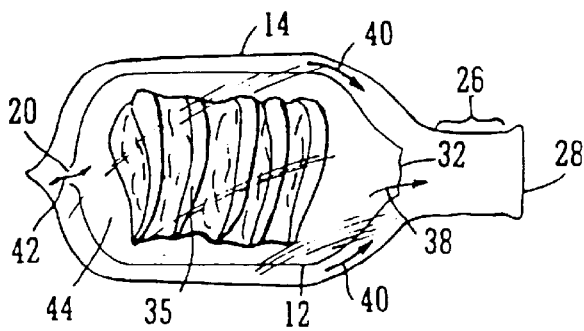

Reference is made to FIGS. 2–5 which illustrate a method of packaging a bone-in meat cut according to the present invention. FIG. 2 shows that a bone-in cut of meat 35 is inserted into the first bag 12. Depending upon how close the bag is fitted to the size of the meat cut, some air may be expelled through the opening 20 in or adjacent the bottom seal of the bag. Next the first bag is inserted into the second bag 14 (FIG. 3). The first bag is pushed deep into the second bag so that the excess length 26 of the second bag extends beyond the open end 32 of the first bag.

FIG. 3 further illustrates the potential air flow paths during a subsequent evacuation step. In this respect when air is evacuated from the outer bag, air flows out from the open end 32 of the inner bag 12 as indicated by arrow 38. Air also is drawn from between the first (inner) bag 12 and the second (outer) bag 14 as indicated by arrows 40. The opening 20 in the bottom seal of the inner bag 12 allows for the passage of air through the opening as indicated by arrow 42 to insure the evacuation of air from any space 44 behind the bone-in meat cut 35.

Figure 4:
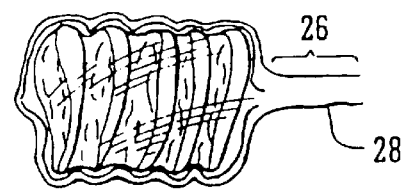

The evacuation of air in effect collapses both bags against the bone-in cut of meat as shown in FIG. 4. The open end 28 of the outer bag then is closed by any suitable means (not shown) such as by gathering and clipping or by heat sealing across the flat width of the bag. This maintains the evacuation of the bags.

Since the outer bag is longer than the inner, gathering and closing the outer bag 14 can be accomplished using only the two plies of the outer bag contained in the extra length 26 and without involving any portion of the inner bag 12. Also, the less prominent ears 34 (FIG. 1) at the open end 32 of the inner bag are less likely to extend into the area of the closure. This is especially important when the closing is accomplished using a heat sealer. Less energy is required to heat seal two plies than to heat seal three or four plies and a more reliable and consistent heat seal closure is made if the same thickness of film is used.

Figure 5:
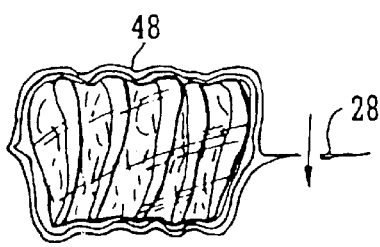

Simultaneous with the closing of the bag, at least a some of the extra length 28 may be trimmed to form the evacuated and sealed bone-in meat package 48 as illustrated in FIG. 5. The next step in the packaging process is to expose the bone-in meat package 48 to 90° C. water or other heating means to shrink the film comprising the inner and outer bags.

The double bag structure as described hereinabove provides several advantages over prior art arrangements for packaging bone-in cuts of meat. For example, the puncture resistance provided by double bagging the cut of meat extends completely around the entire cut of meat with no interruption. This not the case even with patch bags of the prior art that have patches on both sides of a bag or patches extending over the edges of the bag. There is an ease of use in that the meat cut need not be placed in the bag in any particular orientation in order to cover the protruding bones with an extra thickness of film. There is no need for special manufacturing equipment to fold, corona treat or make broad heat seals in order to make a bag having a thicker wall along one side of the bag. Laminators and adhesive applicators for adhering a separate patch film to a bag film also are avoided.

Use of the double bag arrangement of the present invention further is facilitated by the design of each of the two bags. In particular, the meat cut 35, when it is inserted into the first (inner) bag 12 can seat against the partially closed bottom 18 of the bag. This is important in certain bagging operations wherein pushing a cut of meat into a bag forces the bag off of a bag holder. The interrupted heat seal forming the closed bottom 18 of the first bag provides a vent opening 20 which allows the venting of air from the rear of the inner bag during evacuation. Having the first bag which is shorter in length than the second (outer) bag avoids having to include film material of the first bag in the closing of the second bag after evacuation.

Thus it should be appreciated that the present invention accomplishes its intended objects in providing an improved bag arrangement and method for the packaging of bone-in cuts of meat. The present invention provides a bag having a double thickness extending around the entire cut of meat while providing only a single thickness for closing the open mouth of the bag. The double thickness further is provided without the need to laminate patches or to have special manufacturing equipment for making bags having an unbalanced wall structure. Providing an opening in the bottom of the inner bag further insures proper venting of air from the inner bag.

Having described the invention in detail, what is claimed as new is:

1. A method for packaging bone-in cuts of meat comprising:
    a) inserting a bone-in cut of meat into a first heat shrinkable, bottom heat sealed bag, the bag having a vent opening spaced from the bag open end;
    b) inserting the first bag and the bone-in cut of meat it contains into a second, heat shrinkable, bottom sealed bag formed of a multilayer oxygen barrier film, the second bag having a length greater than the first bag to provide the first bag with an extra length of bag film;
    c) evacuating air from the first and second bags wherein the vent opening in the first bag allows the passage of air from one bag to the other;
    d) closing the second bag to form an evacuated package by forming an air tight closure from the extra length of bag film without involving any portion of the first bag in the closure; and
    e) exposing the evacuated package to heat shrinking temperatures to heat shrink at least the second bag thereby forming an article comprising a bone-in cut of meat in an evacuated double walled heat shrunk film package.

2. A method as in claim 1 wherein the first bag as an interrupted heat seal forming the bottom of the bag and the vent opening is defined by the interruption in the heat seal.

3. A method as in claim 1 wherein said first bag is formed of a multilayer oxygen barrier film.

4. A method as in claim 1 wherein each bag has an arcuate heat seal forming the bottom of each bag and the arcuate heat seal forming the bottom of the first bag being shallower and less convex than the heat seal forming the bottom of the second bag.

5. A method as in claim 1 wherein closing the second bag is accomplished by heat sealing across the extra length of bag film.

\* \* \* \* \*

UNITED STATES PATENT AND TRADEMARK OFFICE
CERTIFICATE OF CORRECTION

PATENT NO.    : 6,171,627 B1
DATED         : January 9, 2001
INVENTOR(S)   : Roger Douglas Bert et al.

It is certified that error appears in the above-identified patent and that said Letters Patent is hereby corrected as shown below:

Column 2,
Line 40, insert -- an -- between "further" and "object".

Column 4,
Line 32, delete "is".

Column 5,
Line 35, delete the period after 18.

Column 6,
Line 42, delete "a".
Line 55, insert "was" between "This" and "not".

Claim 4, column 8,
Lines 24 and 25, delete the "h" at the end of line 24 and the "eat" at the beginning of line 25 and insert -- heat --.

Signed and Sealed this

Twenty-seventh Day of November, 2001

Attest:

NICHOLAS P. GODICI
Attesting Officer    Acting Director of the United States Patent and Trademark Office